(12) United States Patent
Ebrahimi Afrouzi

(10) Patent No.: US 10,698,411 B1
(45) Date of Patent: Jun. 30, 2020

(54) RECHARGE STATION FOR MOBILE ROBOT

(71) Applicant: Ali Ebrahimi Afrouzi, San Jose, CA (US)

(72) Inventor: Ali Ebrahimi Afrouzi, San Jose, CA (US)

(73) Assignee: AI Incorporated, Toronto (CA)

( * ) Notice: Subject to any disclaimer, the term of this patent is extended or adjusted under 35 U.S.C. 154(b) by 229 days.

(21) Appl. No.: 15/377,674

(22) Filed: Dec. 13, 2016

(51) Int. Cl.
| G05B 15/00 | (2006.01) |
| G05B 19/00 | (2006.01) |
| G05D 1/02 | (2020.01) |
| B25J 19/00 | (2006.01) |
| B60L 53/14 | (2019.01) |
| B25J 9/00 | (2006.01) |

(52) U.S. Cl.
CPC .......... G05D 1/0225 (2013.01); B25J 19/005 (2013.01); B60L 53/14 (2019.02); G05D 1/0276 (2013.01); B25J 9/0003 (2013.01); Y10S 901/01 (2013.01)

(58) Field of Classification Search
CPC ... G05D 1/0225; G05D 1/0276; B25J 19/005; B60L 11/1816; Y10S 901/01
See application file for complete search history.

(56) References Cited

U.S. PATENT DOCUMENTS

| 4,777,416 A | 10/1988 | George, II et al. |
| 6,525,509 B1 | 2/2003 | Petersson et al. |
| 6,764,372 B1 | 7/2004 | Rae |
| 7,068,004 B2 | 6/2006 | Tsurumi |
| 7,332,890 B2 | 2/2008 | Cohen et al. |
| 7,501,780 B2 | 3/2009 | Yamamoto |
| 8,390,251 B2 | 3/2013 | Cohen et al. |
| 9,215,957 B2 | 12/2015 | Cohen et al. |
| 2005/0156562 A1* | 7/2005 | Cohen .................... A47L 9/2857 320/107 |
| 2007/0050086 A1* | 3/2007 | Lim ...................... G05D 1/0225 700/245 |
| 2007/0244610 A1* | 10/2007 | Ozick ........................ A47L 5/30 701/23 |
| 2010/0324736 A1* | 12/2010 | Yoo ....................... G05D 1/0225 700/259 |
| 2012/0323365 A1* | 12/2012 | Taylor .................... B25J 19/005 700/259 |
| 2016/0229060 A1* | 8/2016 | Kim ....................... G05D 1/0225 |
| 2017/0050311 A1* | 2/2017 | Yoo ........................ G05B 19/416 |
| 2017/0102709 A1* | 4/2017 | Kwak .................. A47L 11/4011 |
| 2017/0147001 A1* | 5/2017 | Shen ..................... A47L 9/2805 |

* cited by examiner

*Primary Examiner* — Harry Y Oh

(57) ABSTRACT

A recharge station for a mobile robot and method for navigating to a recharge station. Two signal emitters on the recharge station emit uniquely identifiable signals in two separate ranges. A mobile robot is configured to look for the signals with two signal receivers, a left receiver looking for the signals of the left emitter and a right receiver looking for the signals of the right receiver. Upon sensing the left emitter signals with the left receiver and the right emitter signals with the right receiver, the mobile robot is aligned with the recharge station. The mobile robot is configured to then drive forward until charging contacts on the mobile robot make contact with charging contacts on the recharge station.

10 Claims, 5 Drawing Sheets

RECHARGE STATION FOR MOBILE ROBOT

FIELD OF THE INVENTION

This invention relates to a recharge station for a mobile robot and more particularly to methods for navigating a mobile robot to a recharge station.

BACKGROUND OF INVENTION

Various types of mobile robots are used in home and commercial settings to carry out routine tasks like vacuuming, mopping, and polishing floors. These and similar devices are often powered by rechargeable batteries that must be periodically recharged. A mobile robot can be charged manually by connecting it to a charging apparatus. However, it may be more desirable to have method for a mobile robot to automatically recharge itself without the need for a user's intervention.

SUMMARY

It is a goal of the present invention to provide a recharge station for mobile robots.

It is a goal of the present invention to provide a method for mobile robots to automatically navigate to a recharge station.

The aforementioned goals are achieved through a recharge station and method for navigating a robotic device to a recharge station as presented herein.

DETAILED DESCRIPTION OF THE INVENTION

The present invention presents a recharge station for recharging a battery of a mobile robot and method for navigating a mobile robot thereto.

Figure 1A:
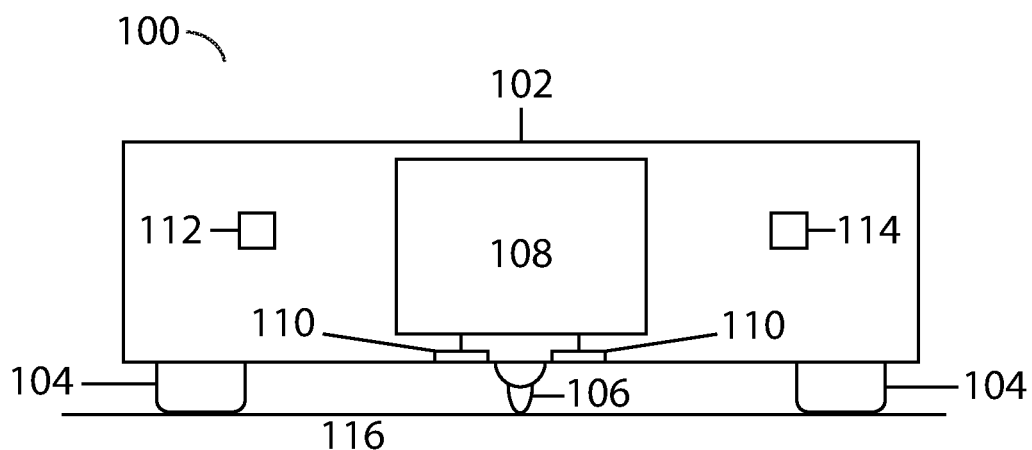
FIG. 1A illustrates a front elevation view of a mobile robot embodying features of the present invention.

Referring to FIG. 1A, an example of a mobile robot is illustrated. As referred to herein, a mobile robot 100 may be comprised of a casing or shell 102, left and right wheels 104, a front wheel 106, a rechargeable battery 108, charging contacts 110 that are electrically coupled to the battery, processor (not illustrated), a right signal receiver 112 and a left signal receiver 114, the signal receivers being electrically coupled to the processor. Line 116 represents the work surface upon which the mobile robot drives. Various types of mobile robots with different components or layouts may be used in conjunction with the presented recharge station, so long as the charging contacts and signal receivers are compatible (positioned appropriately to make contact or receive signals) with the below described recharge station. The example mobile robot is given for illustrative purposes only and is not intended to limit the scope of the invention.

Figure 1B:
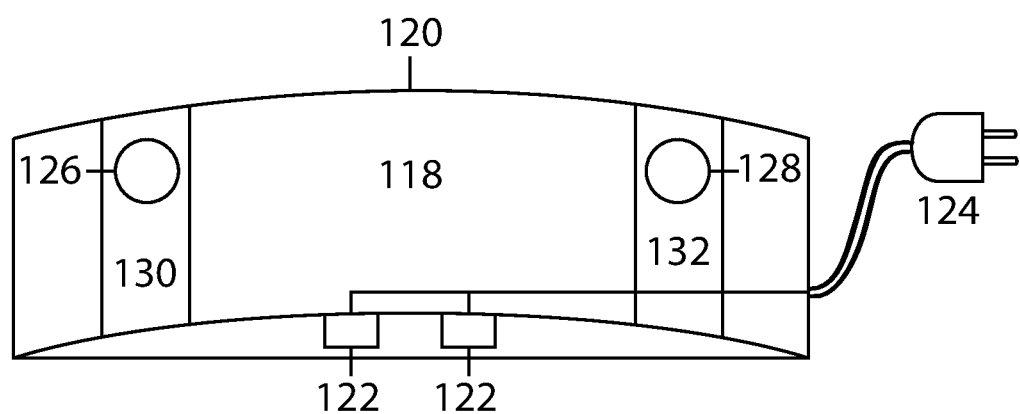
FIG. 1B illustrates a front elevation view of a recharge station embodying features of the present invention.

Referring to FIG. 1B, recharge station 118 is illustrated. Recharge station 118 is comprised of housing 120, charging contacts 122, which are arranged on the surface of the housing so that the charging contacts 110 (see FIG. 1A) of the mobile robot will make contact with them when the mobile robot drives up to and against the recharge station, power supply 124 which is electrically coupled to the charging contacts and supplies power thereto, left signal emitter 126 situated within and at the back of channel 130, and right signal emitter 128 situated within and at the back of channel 132. The channels 130 and 132 serve to limit the signal range of the respective signal emitters 126, 128.

Figure 2:
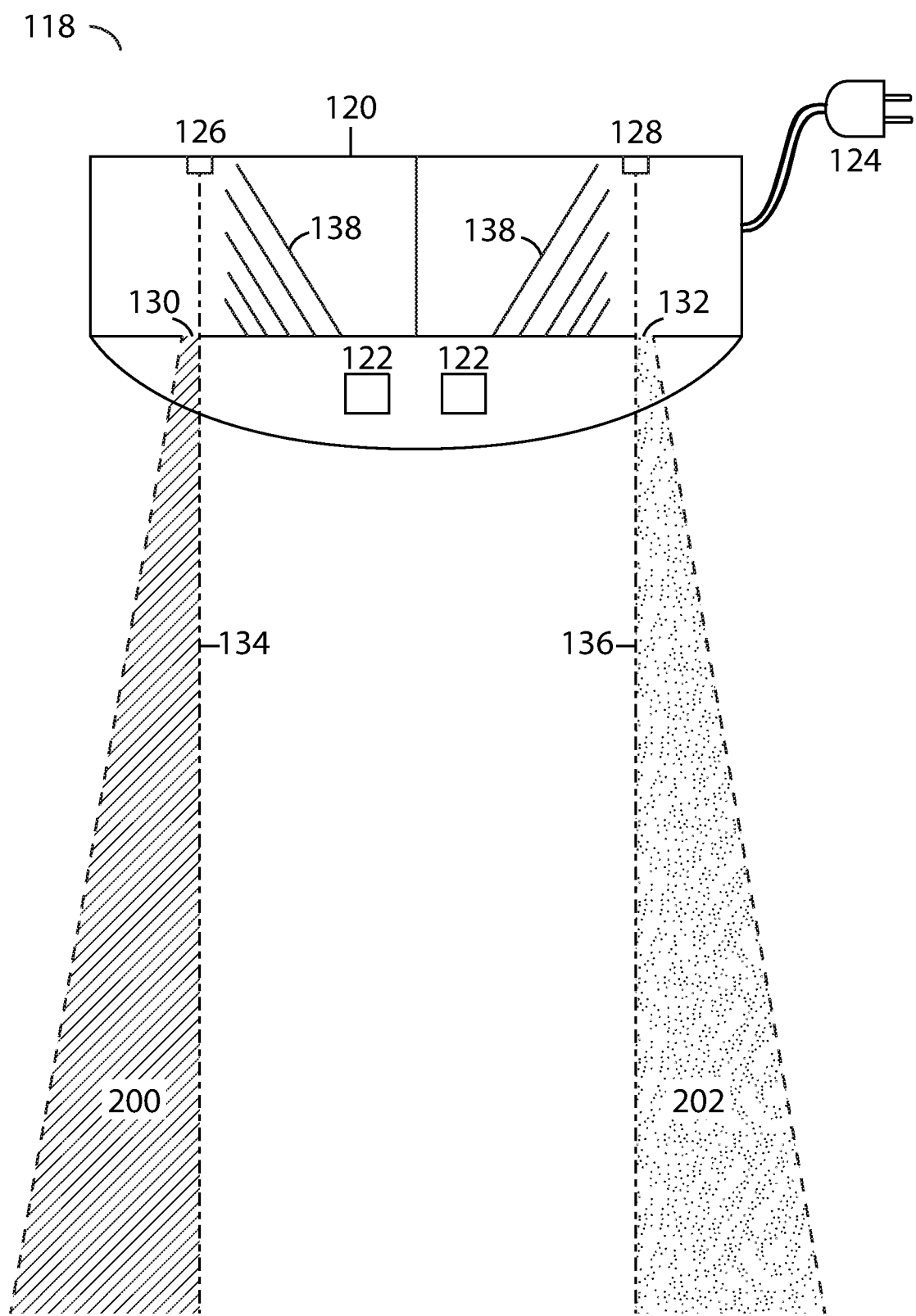
FIG. 2 illustrates an overhead view of a recharge station embodying features of the present invention.

Referring to FIG. 2, an overhead view of recharge station 118 is illustrated. As before, recharge station includes housing 120, charging contacts 122, power supply 124, left signal emitter 126, and right signal emitter 128. Channels 130 and 132 can be seen limiting the signal range of emitters 126, 128. Left signal emitter 126 emits a first signal 134 in range 200 and right signal emitter 128 emits a second signal 136 in range 202. The first and second signals are unique from each other so that they may be differentiated by receivers. Signals may be differentiated by any of: a color of a signal, a carrier frequency of a signal, a modulation of a signal, a bit pattern of a signal, or a wavelength of a signal. Signals may be pulsed, emitted at intervals, or continuous. A number of baffles 138 may also be provided within the housing to further limit the range of the signals and prevent signal reflections from creating false signals. In the preferred embodiment, baffles as well as the walls of the housing are made of a signal-absorbing material. It should be noted that range 200 and range 202 do not overlap. The signals 134 and 136 are each emitted within their own range that is not common with the range of the other signal emitter.

Figure 3:
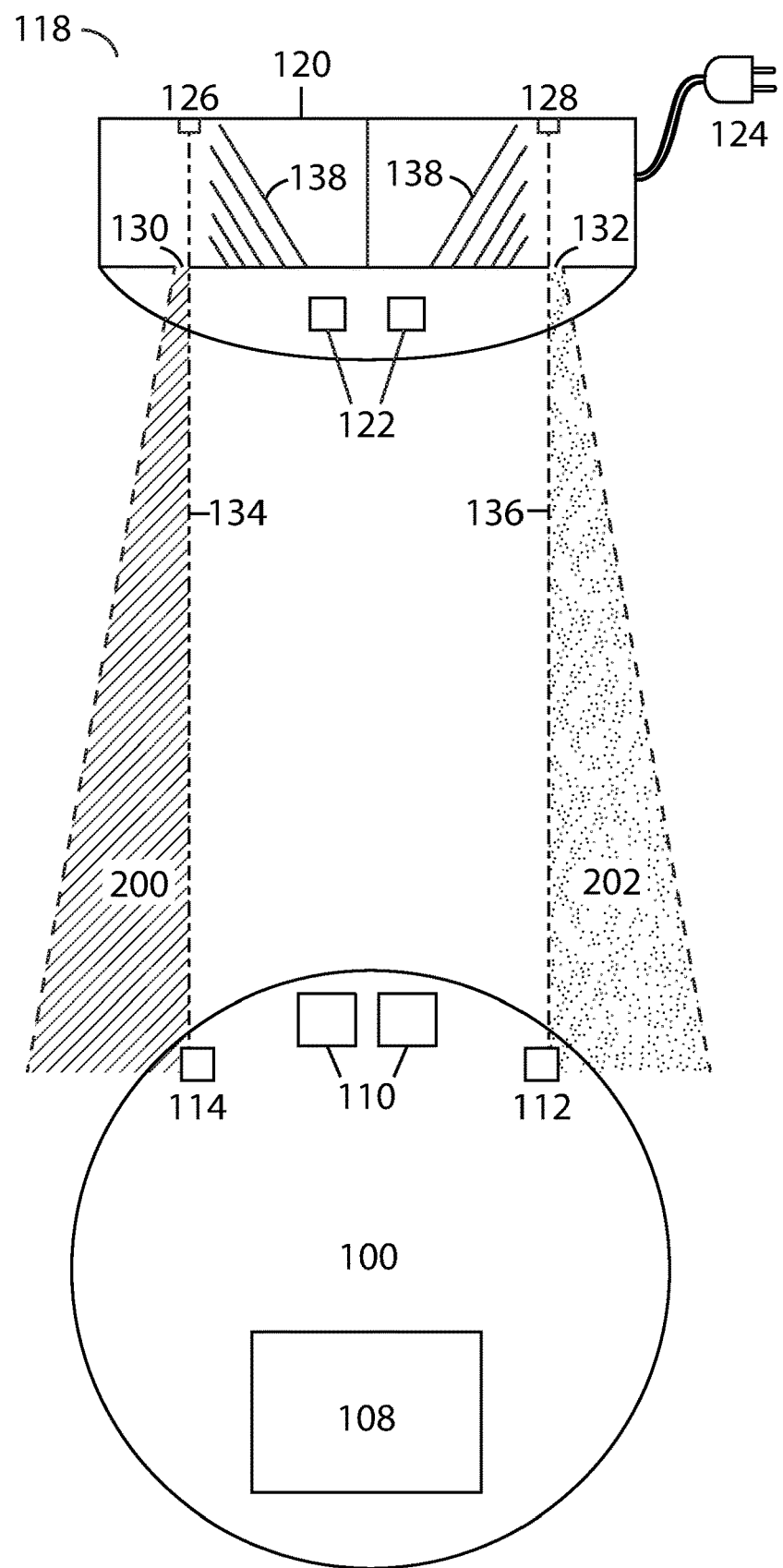
FIG. 3 illustrates an overhead view of a mobile robot navigating to a recharge station embodying features of the present invention.

Referring to FIG. 3, an overhead view of recharge station 118 used in conjunction with mobile robot 100 is illustrated. Mobile robot 100 aligns itself with recharge station 118 using input from left and right signal receivers 114, 112. When left signal receiver 114 detects signals 134 and right signal receiver 112 detects signals 136, then the mobile robot is substantially correctly aligned with the recharge station 118. From this point, the mobile robot needs only to drive in a forward direction until it charging contacts 110 are positioned over the charging contacts 122 to complete the battery circuit and charge the battery 108. A processor (not illustrated) within the mobile robot 200 may be programmed to seek a state in which both of these conditions are met when it enters a recharge station seeking mode. That is, the processor may be configured to seek a state in which the left signal receiver 114 detects signals 134 and the right signal receiver 112 detects signals 136. Seeking such a state may be carried out by driving the mobile robot in a random pattern or by following a set of navigation instructions or by using SLAM or other mapping technology to navigate to the general location of the recharge station and then using signal input as described herein to more precisely navigate to the recharge station.

The processor may be further configured to adjust movement of the mobile robot based on signals received by the receivers. For example, in some embodiments, when right signal receiver 112 receives signals 134 and left signal receiver 114 receives no signals, the processor may be configured to turn the mobile robot clockwise a predetermined number of degrees, or until, for example left receiver 114 detects signals 134, then drive forward a predetermined distance, then rotate in a counterclockwise direction until left receiver 114 detects signals 134 and right receiver 112 detects signals 136. In a like manner, in some embodiments, when left signal receiver 114 receives signals 136 and right signal receiver 112 receives no signals, the processor may be configured to turn the mobile robot counterclockwise a predetermined number of degrees, or until, for example, right receiver detects signals 136, then drive forward a predetermined distance, then rotate in a clockwise direction until right receiver 112 detects signals 136 and left receiver 114 detects signals 134.

Additional navigational instructions may be defined for various scenarios, such as when the same signal is received by both receivers, when the receivers receive the correct signals for a period but after driving a distance, one of the receivers no longer receivers the corresponding correct modulated signal, etc.

Figure 4:
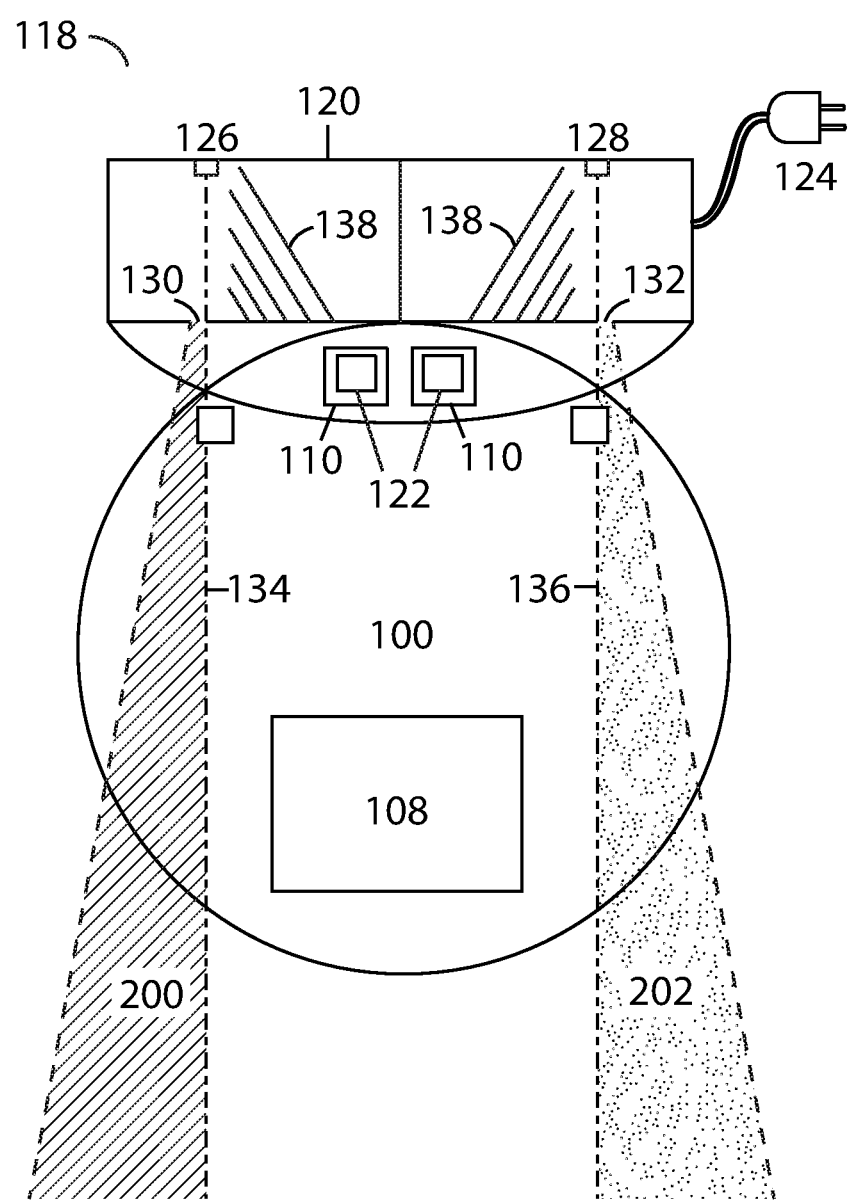
FIG. 4 illustrates an overhead view of a mobile robot recharging on a recharge station embodying features of the present invention.

Referring to FIG. 4, an overhead view of a mobile robot 100 recharging on a recharge station 118 is illustrated. (Some of the numbers have been omitted in this view so as not to unnecessarily obscure the invention.) As can be seen, charging contacts 110 on mobile robot 100 are positioned over charging contacts 122 on the recharge station 118, which causes them to make contact and complete the battery circuit to charge the battery 108.

Figure 5:
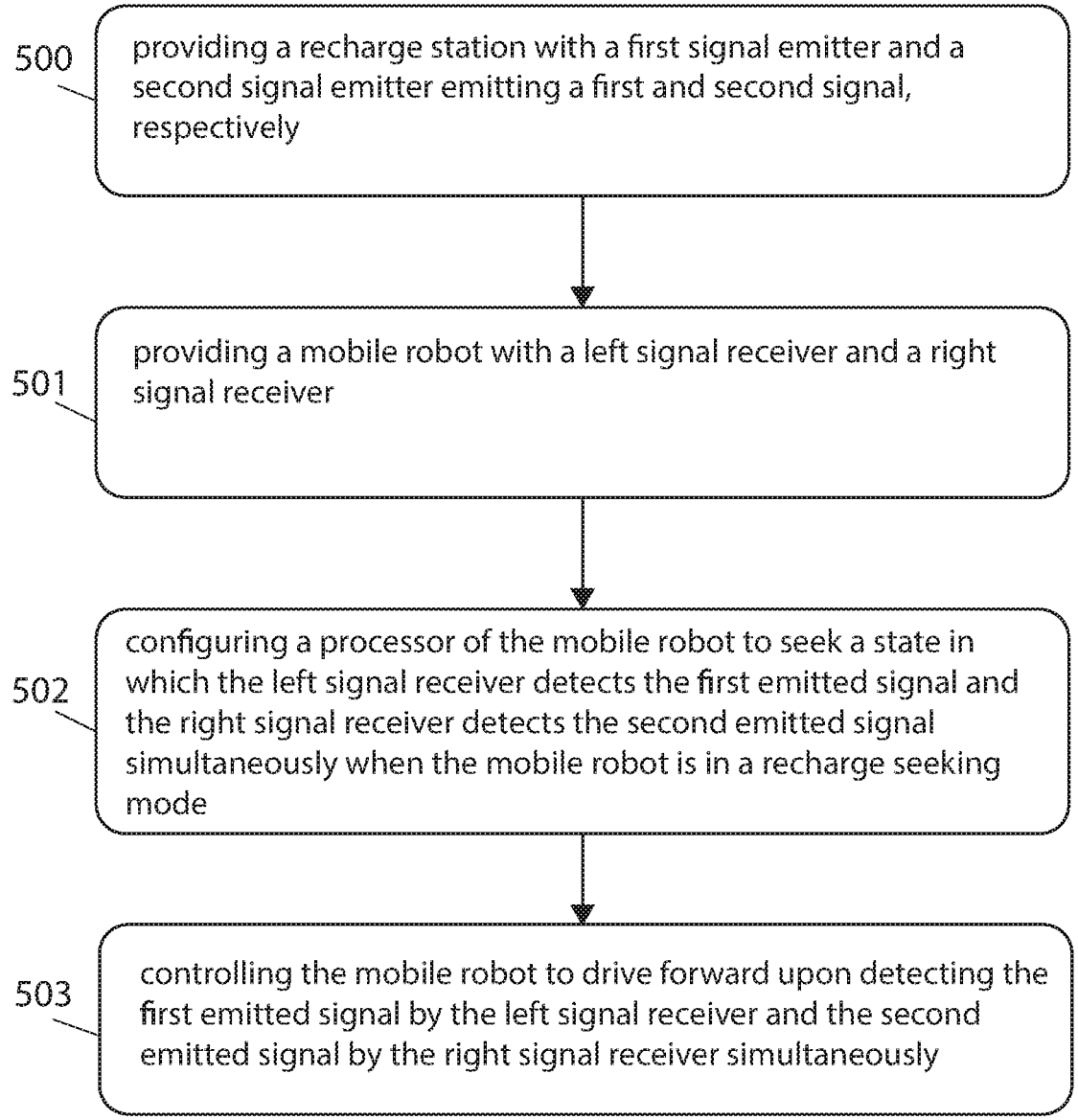
FIG. 5 illustrates a flowchart describing a method for recharging a mobile robot according to some embodiments.

FIG. 5 illustrates a flowchart describing a method for recharging a mobile robot including steps 500, 501, 502, and 503 according to some embodiments.

I claim:

1. A mobile robot recharging system comprising:
    a mobile robot comprising:
        a housing;
        a set of wheels for driving;
        a motor for driving the wheels;
        a processor;
        a rechargeable battery;
        two charging contacts for recharging said battery;
        a first signal receiver; and
        a second signal receiver; and
    a recharge station comprising:
        a housing;
        two charging contacts positioned on the surface of the housing such that they complete a battery circuit when they make contact with the two charging contacts of the mobile robot;
        a power supply electrically coupled with the charging contacts to provide electrical power thereto;
        a first signal emitter positioned within a first channel emitting a first signal in a predetermined range; and,
        a second signal emitter positioned within a second channel emitting a second signal, distinguishable from the first signal, in a predetermined range, separate from the predetermined range of the first signal;
    wherein the mobile robot is configured to align with the recharge station by detecting the first signal with the first signal receiver and the second signal with the second signal receiver simultaneously, and wherein the first channel and second channel limit the range of the first signal emitter and second signal emitter, respectively, such that the signals from the first signal emitter and the signals from the second signal emitter do not overlap.

2. The system of claim 1, wherein the mobile robot is configured to differentiate the first and second signals from one another by any of a color of a signal, a carrier frequency of a signal, a modulation of a signal, a bit pattern of a signal and a wavelength of a signal.

3. A method for recharging a mobile robot comprising:
    providing a recharge station comprised of:
        a housing;
        two charging contacts positioned on the surface of the housing such that they complete a battery circuit when they make contact with corresponding charging contacts on a mobile robot positioned adjacent to the recharge station;
        a power supply electrically coupled with the charging contacts to provide electrical power thereto;
        a left signal emitter positioned in a first channel and emitting a first signal in a predetermined range limited by the first channel; and,
        a right signal emitter positioned in a second channel and emitting a second signal, distinguishable from the first signal, in a predetermined range limited by the second channel, separate from the predetermined range of the first signal such that the first signal from the first signal receiver and the second signal from the second signal receiver do not overlap;
    providing the mobile robot comprising a housing including a set of wheels for driving, a motor for driving the wheels, a processor or control unit for controlling said wheels, a rechargeable battery, at least two charging contacts for recharging said battery, and a left signal receiver and a right signal receiver for receiving signals emitted by the signal emitters of the recharge station;
    configuring the processor of the mobile robot to seek a state in which the left signal receiver detects the first emitted signal and the right signal receiver detects the second emitted signal simultaneously when the mobile robot is in a recharge seeking mode;
    upon detecting the first emitted signal by the left signal receiver and the second emitted signal by the right signal receiver simultaneously, controlling the mobile robot to drive forward.

4. The method of claim 3, wherein the first and second signals are differentiated from one another by any of a color of a signal, a carrier frequency of a signal, a modulation of a signal, a bit pattern of a signal and a wavelength of a signal.

5. The method of claim 3 further comprising, reducing the speed of the mobile robot to a predetermined speed upon detecting the first emitted signal by the left signal receiver and the second emitted signal by the right signal receiver simultaneously.

6. The method of claim 3 further comprising, halting movement of the robot upon detecting that the charging contacts of the mobile robot have made contact with the charging contacts of the recharge station.

7. The method of claim 3 further comprising, if the step of configuring the processor is not successfully completed, seeking instead either the first or second signal with both the left and right receiver of the mobile robot, and then following a set of predetermined navigation instructions based on the signal input received in order to bring the mobile robot to a state in which the left signal receiver detects the first emitted signal and the right signal receiver detects the second emitted signal, then proceeding with the step of controlling the mobile robot to drive forward.

8. The method of claim 3 further comprising, if the right signal receiver detects the first emitted signal and the left signal receiver detects no signal, turning the mobile robot clockwise a predetermined number of degrees or until the left signal receiver detects the first emitted signal, then driving the mobile robot forward a predetermined distance, then turning the mobile robot counterclockwise until the left signal receiver detects the first emitted signal again and the right signal receiver detects the second emitted signal, then proceeding with the step of controlling the mobile robot to drive forward.

9. The method of claim 3 further comprising, if the left signal receiver detects the second emitted signal and the right signal receiver detects no signal, turning the mobile robot counterclockwise a predetermined number of degrees or until the right signal receiver detects the second emitted signal, then driving the mobile robot forward a predetermined distance, then turning the mobile robot clockwise until the right signal receiver detects the second emitted signal again and the left receiver detects the first emitted signal, then proceeding with the step of controlling the mobile robot to drive forward.

10. The method of claim 3 wherein, seeking the described state is comprised of driving the mobile robot in either a predetermined pattern or a random pattern until the state is detected.

\* \* \* \* \*